US012809764B2

(12) United States Patent
Huang et al.

(10) Patent No.: US 12,809,764 B2
(45) Date of Patent: Nov. 24, 2026

(54) METHODS FOR ALLOCATING MEMORY OF DATABASE, COMPUTER-READABLE MEDIA, AND STORAGE ENGINES

(71) Applicant: Alipay (Hangzhou) Information Technology Co., Ltd., Hangzhou (CN)

(72) Inventors: Hua Huang, Hangzhou (CN); Bingpeng Zhu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/980,580

(22) Filed: Dec. 13, 2024

(65) Prior Publication Data

US 2025/0208991 A1 Jun. 26, 2025

(30) Foreign Application Priority Data

Dec. 25, 2023 (CN) ......................... 202311806748.6

(51) Int. Cl.
*G06F 12/02* (2006.01)
*G06F 16/22* (2019.01)
*G06F 9/50* (2006.01)

(52) U.S. Cl.
CPC ........ *G06F 12/023* (2013.01); *G06F 16/2246* (2019.01); *G06F 9/5016* (2013.01)

(58) Field of Classification Search
CPC ... G06F 12/023; G06F 16/2246; G06F 9/5016
USPC .................................................. 711/154, 100
See application file for complete search history.

(56) References Cited

U.S. PATENT DOCUMENTS

2017/0091327 A1* 3/2017 Bostic .................... G06F 16/252
2020/0117589 A1* 4/2020 Davis ..................... G06F 9/5016
2020/0341678 A1* 10/2020 Jin ......................... G06F 3/0653
2023/0376202 A1* 11/2023 Wang ..................... G06F 3/0673
2023/0376476 A1* 11/2023 Bhola ................. G06F 16/2246

* cited by examiner

*Primary Examiner* — Hosain T Alam
*Assistant Examiner* — Zubair Ahmed
(74) *Attorney, Agent, or Firm* — Fish & Richardson P.C.

(57) ABSTRACT

Computer-implemented methods, devices and storage media are described for allocating a memory of a database. The database includes a storage engine for data storage based on a log-structured merge (LSM) tree, and at least one database instance. The memory is configured to store data in a MemTable and an immutable MemTable respectively corresponding to the at least one database instance. An example method includes: determining a quantity of data stored in each database instance in the database in a historical period; predicting a memory needed by each database instance in a next period, where the memory needed by the database instance in the next period is positively correlated with the quantity of data stored in the database instance in the historical period; and allocating the memory for each database instance in the next period based on the predicted memory needed by the database instance in the next period.

18 Claims, 3 Drawing Sheets

METHODS FOR ALLOCATING MEMORY OF DATABASE, COMPUTER-READABLE MEDIA, AND STORAGE ENGINES

CROSS-REFERENCE TO RELATED APPLICATIONS

This application claims priority to Chinese Patent Application No. 202311806748.6, filed on Dec. 25, 2023, which is hereby incorporated by reference in its entirety.

TECHNICAL FIELD

This disclosure relates to the field of computer technologies, and in particular, to methods for allocating a memory of a database, computer-readable media, and storage engines.

BACKGROUND

A storage engine can store, in a memory, data in a MemTable and an immutable MemTable corresponding to a new database instance, and the data in the immutable MemTable can be further written to a persistent storage medium by using a background thread. Allocating an appropriate memory for the database instance helps improve efficiency of writing data to the persistent storage medium and enhances memory utilization. If an excessively large memory is allocated to the database instance, the data in the MemTable corresponding to the database instance occupy the memory for a long time, resulting in reduction in memory utilization. If an excessively small memory is allocated to the database instance, an operation of writing data to the persistent storage medium is frequently performed, resulting in an increase in data write amplification and reduction in data write efficiency.

SUMMARY

According to a first aspect, one or more embodiments of this disclosure provide a method for allocating a memory of a database. The database includes a storage engine for data storage based on an LSM tree, and the database includes at least one database instance. The memory is configured to store data in a MemTable and an immutable MemTable respectively corresponding to the at least one database instance. The method includes: determining a quantity of data stored in each database instance in the database in a historical period; predicting a memory needed by each database instance in a next period based on the quantity of data stored in the database instance in the historical period, where the memory needed by the database instance in the next period is positively correlated with the quantity of data stored in the database instance in the historical period; and allocating the memory for each database instance in the next period based on the predicted memory needed by the database instance in the next period.

According to a second aspect, one or more embodiments of this disclosure provide a computer-readable storage medium. The computer-readable storage medium stores a computer program, and the program is executed by a processor to implement the method in any one of the embodiments of this disclosure.

According to a third aspect, one or more embodiments of this disclosure provide a storage engine, configured to store data based on an LSM tree. The storage engine includes a storage, a processor, and a computer program that is stored in the storage and that is capable of running on the processor. The processor executes the program to implement the method in any one of the embodiments of this disclosure.

In the embodiments of this disclosure, the memory needed by each database instance in the next period is predicted based on the quantity of data of the database instance in the historical period. The memory needed by the database instance in the next period is positively related to the quantity of data stored in the database instance in the historical period, and the quantity of data stored in the database instance is related to a memory storage demand of the data in a MemTable and an immutable MemTable corresponding to the database instance. In one aspect, if the quantity of data stored in the database instance in the historical period is relatively small, it can be predicted that the memory storage demand of the data in the MemTable and the immutable MemTable corresponding to the database instance is relatively low in the next period, so that a relatively small memory can be allocated to the database instance to enhance memory utilization. In another aspect, if the quantity of data of the database instance in the historical period is relatively large, it can be predicted that the memory storage demand of the data in the MemTable and the immutable MemTable corresponding to the database instance is relatively high in the next period, so that a relatively large memory can be allocated to the database instance, to reduce a frequency of writing data from the memory to a persistent storage medium, thereby reducing write amplification.

It should be understood that the above-mentioned general descriptions and the following detailed descriptions are only exemplary and explanatory, and are not intended to limit this disclosure.

BRIEF DESCRIPTION OF DRAWINGS

The accompanying drawings here are incorporated into the specification and constitute a part of this disclosure. The accompanying drawings illustrate embodiments that conform to this disclosure and are used together with the specification to describe the technical solutions of this disclosure.

DESCRIPTION OF EMBODIMENTS

Figure 1:
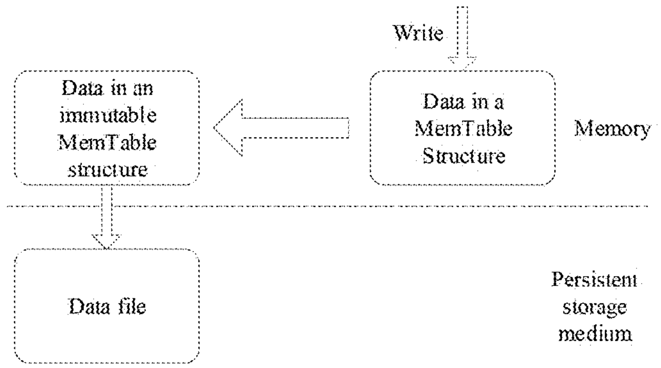
FIG. 1 is a schematic diagram illustrating an application scenario, according to one or more embodiments of this disclosure.

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with the present disclose. On the contrary, the embodiments are merely examples of apparatuses and methods that are described in the appended claims in detail and consistent with some aspects of this disclosure.

The terms used in the present disclose merely for illustrating specific embodiments, and are not intended to limit the present disclose. The terms "a" and "the" of singular forms used in the present disclose and the appended claims are also intended to include plural forms, unless otherwise specified in the context clearly. It should be further understood that the term "and/or" used in this specification indicates and includes any or all possible combinations of one or more associated listed items. In addition, the term "at least one" in the specification represents any one of "a plurality of" or any combination of at least two of "a plurality of".

It should be understood that although terms "first", "second", "third", etc. can be used in this disclosure to describe various types of information, the information is not limited to the terms. These terms are only used to distinguish the same type of information from each other. For example, without departing from the scope of this disclosure, first information can also be referred to as second information, and similarly, the second information can be referred to as the first information. Depending on the context, for example, the term "if" used here can be interpreted as "in a case that . . . ", "when . . . ", or "in response to determining".

To make a person skilled in the art better understand the technical solutions in the embodiments of this disclosure, and make the above-mentioned objectives, features, and advantages of the embodiments of this disclosure clearer and easy to understand, the following further describes the technical solutions in the embodiments of this disclosure in detail with reference to the accompanying drawings.

A storage engine is a component in a database management system that is responsible for storage, management, and access of data. The storage engine defines data organized, read, and written in a database. In some embodiments, the storage engine can include a storage engine based on a log-structured merge (LSM) tree. The LSM tree is a data structure that is used to store and manage a large-scale data set and is usually used in a high-performance key-value storage engine or a distributed database system. The LSM tree maintains a multi-level index structure. A lowest level includes a series of ordered segments. Each segment includes a certain range of key-value pairs. An index structure at an upper layer points to a range of segments at a lower level to accelerate a read operation. When a data quantity increases, a new segment is created and combined with an older segment based on a specific combination policy, to decrease a quantity of segments and optimize read performance. The storage engine based on the LSM tree can include but is not limited to a LevelDB storage engine.

Figure 2:
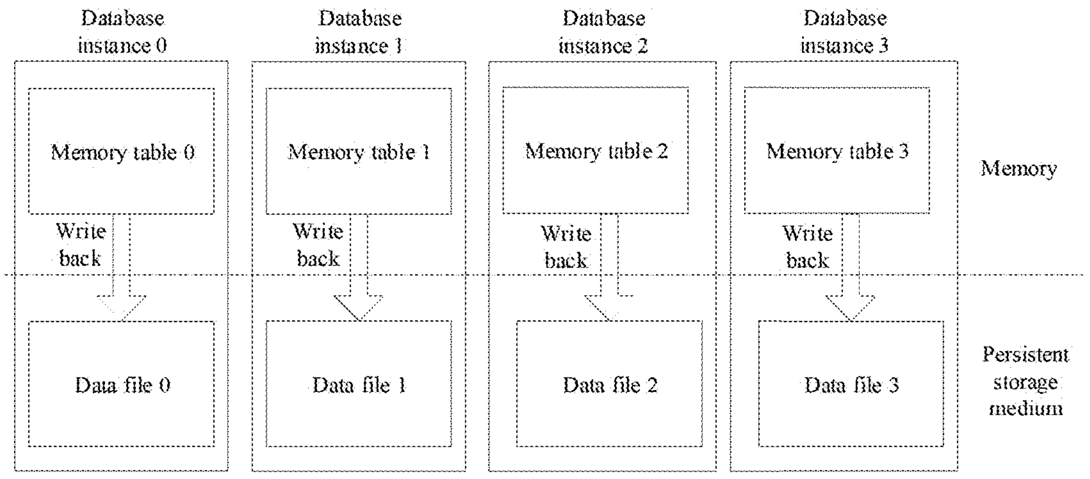
FIG. 2 is a schematic diagram illustrating data stored in a database instance, according to one or more embodiments of this disclosure.

As shown in FIG. 1 and FIG. 2, when writing data to a database instance, the storage engine can first write the data to a memory, and the data are organized and stored in the memory by using a MemTable (mutable memory table) and an immutable MemTable (immutable memory table). The data in the MemTable is mutable, that is, data can be inserted, updated, or deleted at runtime. However, the data in the immutable MemTable is immutable. Once the immutable MemTable is created, the data in the immutable MemTable cannot be changed. When the data in the immutable MemTable satisfies a data write-back condition, the storage engine can further write the data back to a persistent storage medium (for example, a disk) for persistent storage. The data in the immutable MemTable corresponding to the database instance can be stored in the persistent storage medium.

The database can include one or more database instances, and in the memory, each database instance has data in the MemTable and the immutable MemTable corresponding to the database instance. As shown in FIG. 2, the database includes database instance 0, database instance 1, database instance 2, and database instance 3. Data written to database instance 0 can be first stored in a memory table (denoted as memory table 0) corresponding to database instance 0 in the memory, and the data is first stored in the MemTable and then transferred to the immutable MemTable. The data in the immutable MemTable corresponding to database instance 0 can be further written to the persistent storage medium. Similarly, data written to database instance 1 can be first stored in a memory table (denoted as memory table 1) corresponding to database instance 1 in the memory, and the data is first stored in the MemTable and then transferred to the immutable MemTable. The data in the immutable MemTable corresponding to database instance 1 can be further written to the persistent storage medium. A method for writing data to database instance 2 and database instance 3 in the memory and the persistent storage medium are similar to the above-mentioned storage method, and details are omitted here for simplicity.

Further, the persistent storage medium includes a plurality of storage layers (denoted as an L0 layer, an L1 layer, etc.), and several data files are created at each storage layer. The storage engine can write the data in the immutable MemTable to the data file at the L0 layer in the storage layers. When a quantity of data files at the L0 layer reaches a specific data quantity, the data files at the L0 layer are combined and then written to the data file at the L1 layer in the storage layers.

Allocating an appropriate memory for the database instance helps improve efficiency of writing data to the persistent storage medium and enhances memory utilization. In one aspect, if an excessively large memory is allocated to the database instance, the data in the MemTable corresponding to the database instance occupy the memory for a long time, resulting in reduction in memory utilization. Once burst data write occurs, it is easy to cause a data loss and a system crash. In another aspect, if an excessively small memory is allocated to the database instance, an operation of writing data to the persistent storage medium is frequently performed, resulting in an increase in data write amplification and reduction in data write efficiency.

In a related technology, a user usually configures a unified memory for database instances, for example, 128 MB. When a data scale of the database instance is relatively small, this memory allocation method does not lead to relatively large overall write amplification. However, when the data scale of the database instance is relatively large, for example, reaching a level of hundreds of GB or even a TB level, the memory of 128 MB is relatively small, and the storage engine needs to frequently write data in the memory back to the persistent storage medium, causing relatively large overall write amplification. Under given memory resources, the user can create a plurality of database instances. A quantity of database instances created by the user and a data scale of each database instance may be unable to know during creation of the database instance. Therefore, it is difficult for the related technology to optimize overall write amplification.

Figure 3:
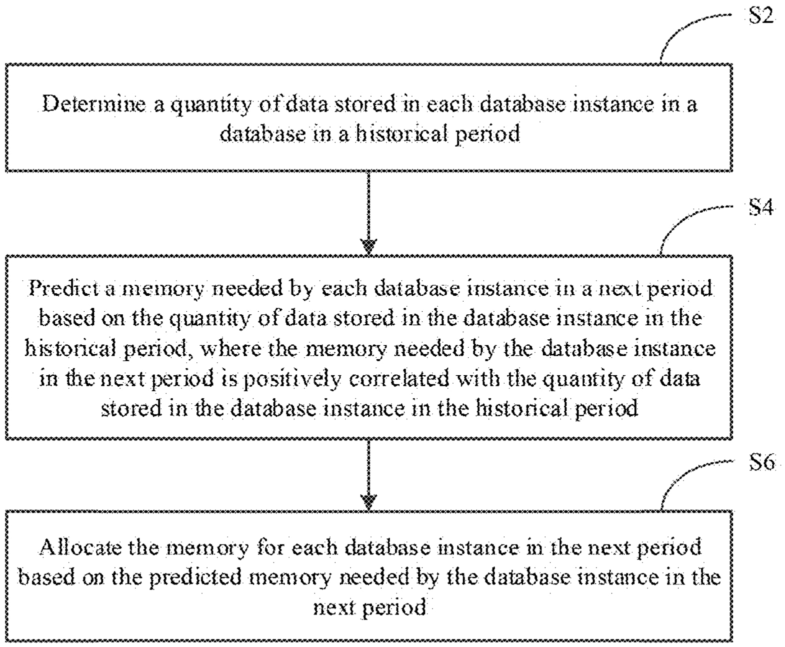
FIG. 3 is a flowchart illustrating a memory allocation method, according to one or more embodiments of this disclosure.

Based on this, the embodiments of this disclosure provide a method for allocating a memory of a database. The database includes a storage engine for data storage based on an LSM tree, and the database includes at least one database instance. The memory is configured to store data in a MemTable and an immutable MemTable respectively corresponding to the at least one database instance. Referring to FIG. 3, the memory allocation method includes the following steps:

Step S2: Determine a quantity of data stored in each database instance in the database in a historical period.

Step S4: Predict a memory needed by each database instance in a next period based on the quantity of data stored in the database instance in the historical period, where the memory needed by the database instance in the next period is positively correlated with quantity of data stored in the database instance in the historical period.

Step S6: Allocate the memory for each database instance in the next period based on the predicted memory needed by the database instance in the next period.

A case that includes four database instances shown in FIG. 2 is used as an example below to describe the solutions in the embodiments of this disclosure. It can be understood that the case shown in the figure is merely an example for description. In practice, a quantity of database instances in a database can also be greater than or less than 4.

In step S2, quantities of data stored in database instance 0, database instance 1, database instance 2, and database instance 3 in the historical period can be respectively obtained, which are respectively denoted as d0, d1, d2, and d3. The quantity of data stored in the database instance in the historical period can be a quantity of data stored in the database instance in a previous historical period, or can be an average value of quantities of data stored in the database instance in several previous historical periods, etc. For example, assume that quantities of data stored in database instance 0 in a T0 period, a T1 period, and a T2 period are respectively d00, d01, and d02, and the T2 period is the previous period. In this case, the quantity do of data stored in database instance 0 in the historical period can be the quantity d02 of data stored in the database instance in the T2 period, or the quantity d0 of data stored in database instance 0 in the historical period can be equal to an average value of d00, d01, and d02. Certainly, in addition to the two implementations, there can be other implementations.

In some embodiments, the quantity of data stored in the database instance in the historical period can be represented by a total quantity of data of the database instance that has been persisted to a persistent storage medium. Generally, a higher frequency of performing a write operation on the database instance indicates a larger speed that the quantity of data stored in the database instance increases, and a larger total quantity of data of the database instance that has been persisted to the persistent storage medium. On the contrary, a lower frequency of performing a write operation on the database instance indicates a smaller speed that the quantity of data stored in the database instance increases, and a smaller total quantity of data of the database instance that has been persisted to the persistent storage medium. Therefore, the total quantity of data of the database instance that has been persisted to the persistent storage medium can be used to reflect a frequency of writing the data stored in the database instance back to the persistent storage medium.

The total quantity of data of the database instance that has been persisted to the persistent storage medium can be a cumulative data quantity of data that has been persisted to the persistent storage medium in historical periods, and the data quantity is less affected by a transient network fluctuation. Therefore, accuracy is relatively high when the total quantity of data of the database instance that has been persisted to the persistent storage medium is used to represent the quantity of data stored in the database instance in the historical period.

In some other embodiments, the quantity of data stored in the database instance in the historical period can be represented by a total quantity of data of the database instance stored in the memory and data that has been persisted to a persistent storage medium. Data written to the database instance is first stored in the memory and then persisted to the persistent storage medium. Therefore, the total quantity of data stored in the memory and data that has been persisted to the persistent storage medium can roughly reflect an overall data scale that the database instance can reach in the historical period, and reflect the memory needed by the database instance in the next period.

Figure 4:
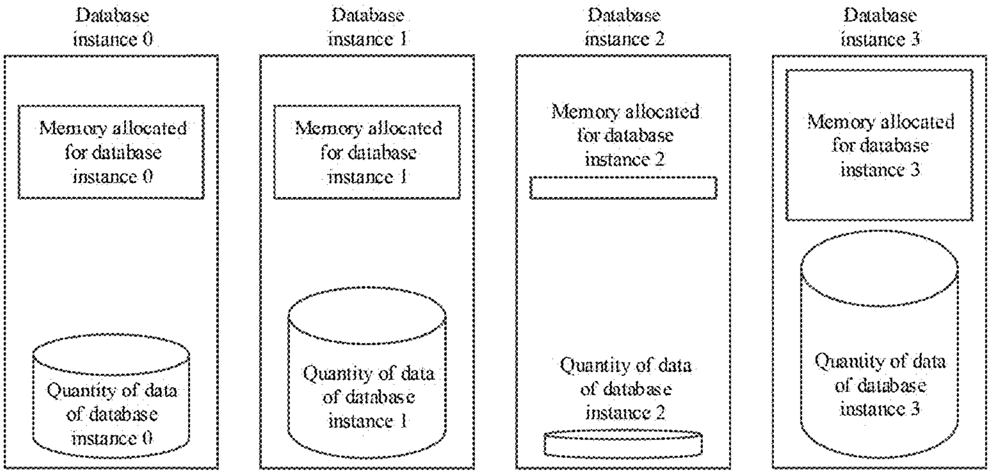
FIG. 4 is a schematic diagram illustrating a relationship between a memory allocated to a database instance and a quantity of data stored in a database instance, according to one or more embodiments of this disclosure.

In step S4, the memory needed by each database instance in the next period can be predicted based on the quantity of data of the database instance in the historical period. Using database instance 0 in FIG. 2 as an example, if the quantity of data stored in database instance 0 in the historical period is relatively large, it is predicted that a memory needed by the database instance in the next period is relatively large; or if the quantity of data stored in database instance 0 in the historical period is relatively small, it is predicted that a memory needed by the database instance in the next period is relatively small. As shown in FIG. 4, a cylindrical object represents a quantity of data stored in a database instance, and a block represents a memory allocated to the database instance. For visual clarity, the quantity of data stored in the database instance is positively correlated with a height of the cylindrical object, and the memory allocated to the database instance is positively correlated with a height of the block. It can be seen that a larger height of the cylindrical object indicates a larger memory allocated to the corresponding database instance and vice versa.

With reference to FIG. 4, database instance 0 is used as an example below to describe a method for predicting the memory needed by the database instance in the next period.

In some embodiments, an allocable memory D_ava can be obtained; a total quantity D_total of data stored in all the database instances in the historical period is calculated; a ratio of the quantity do of data stored in database instance 0 in the historical period to the total quantity D_total of data is determined; and a memory DM0 needed by database instance 0 in the next period is determined based on the allocable memory D_ava and the ratio. A larger ratio indicates a larger proportion of the memory needed by database instance 0 in the next period in the allocable memory D_ava, and a smaller ratio indicates a smaller proportion of the memory needed by database instance 0 in the next period in the allocable memory D_ava.

When the database instances include database instance 0, database instance 1, database instance 2, and database instance 3 shown in FIG. 4, the total quantity D_total of data stored in the database instances in the historical period can be denoted as the sum of quantities of data stored in the database instances in the historical period, that is, D_total=d0+d1+d2+d3.

Therefore, the memory DM0 needed by database instance 0 in the next period can be denoted as: DM0=D_ava*d0/(d0+d1+d2+d3).

The above-mentioned ratio can reflect a proportion of the quantity of data stored in database instance 0 in the total quantity of data stored in the database instances, so that the allocable memory D_ava is allocated to database instance 0 as needed based on the proportion of database instance 0 in the total quantity of data. For a method for calculating a memory needed by another database instance in the next period, references can be made to database instance 0. Details are omitted here for simplicity.

In some embodiments, an allocable upper memory limit value d_max and an allocable lower memory limit value d_min can be pre-configured for each database instance. For convenience, the same allocable upper memory limit value d_max and lower memory limit value d_min can be configured for the database instances, but this disclosure is not limited thereto.

After a memory needed in the next period is determined for a database instance, it can be determined whether the memory needed in the next period determined for the database instance is not greater than the upper memory limit value d_max and is not less than the lower memory limit value d_min. If yes, memory allocation is performed based on the memory needed by the database instance in the next period. Continuing from the above-mentioned embodiment, if the memory DM0 needed in the next period calculated for database instance 0 is not greater than the upper memory limit value d_max and is not less than the lower memory limit value d_min, the calculated DM0 is determined as the memory needed by database instance 0 in the next period, and the memory is allocated to database instance 0 in the next period based on the calculated DM0.

Figure 5:
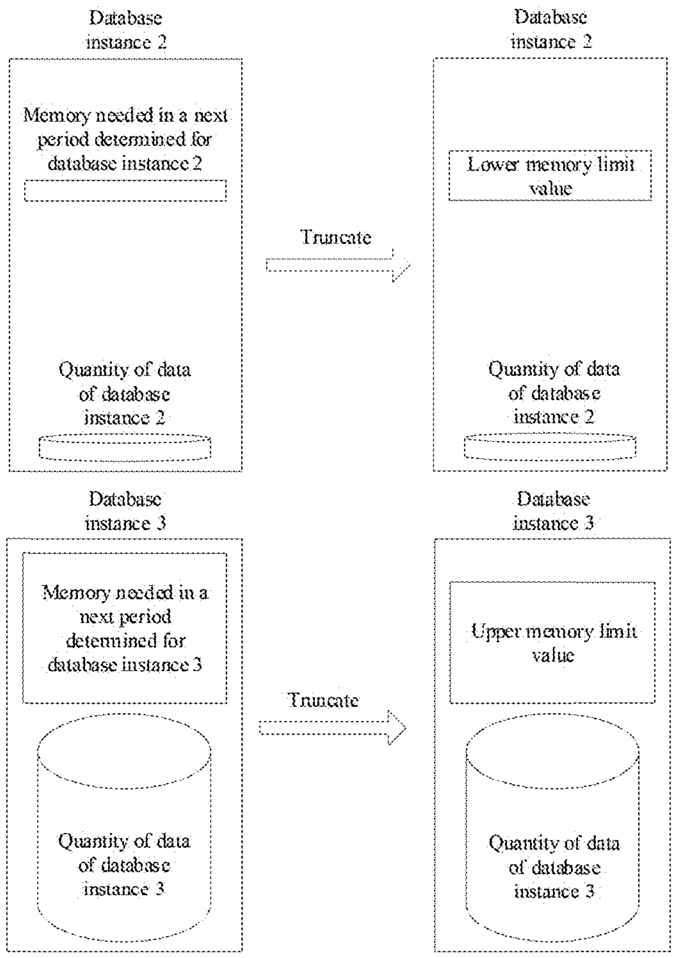
FIG. 5 is a schematic diagram illustrating a process of truncating a predicted memory, according to one or more embodiments of this disclosure.

Referring to FIG. 5, if a memory needed in the next period determined for a database instance is greater than the upper memory limit value d_max, the memory needed by the database instance in the next period is determined as a first memory value that is not greater than the upper memory limit value d_max, and the memory is allocated to the database instance in the next period based on the first memory value. If a memory needed in the next period determined for a database instance is less than the lower memory limit value d_min, the memory needed by the database instance in the next period is determined as a second memory value that is not less than the lower memory limit value d_min, and the memory is allocated to the database instance in the next period based on the second memory value. The above-mentioned process is referred to as truncation of a memory. The first memory value can be the upper memory limit value d_max (for example, 256 MB), or can be another value slightly less than the upper memory limit value d_max. The second memory value can be the lower memory limit value d_min (for example, 4 MB), or can be another value slightly greater than the lower memory limit value d_min. The calculated memory is truncated by using the first memory value to avoid allocating an excessively large memory to the database instance, thereby mitigating a problem that memory utilization is low because the data in the MemTable corresponding to the database instance occupies memory space for a long time. The calculated memory is truncated by using the second memory value to avoid allocating an excessively small memory to the database instance, thereby reducing a write-back frequency of the data in the immutable MemTable corresponding to the database instance, and further reducing data write magnification.

It can be understood that the above-mentioned memory prediction method is merely an example for description. In another example, a plurality of data quantity intervals can also be set, and each data quantity interval corresponds to one memory value. When a quantity of data stored in a database instance falls within a corresponding data quantity interval, a memory allocated to the database instance is determined as a memory value corresponding to the data quantity interval. For example, the plurality of data quantity intervals can include [1G, 2G] (denoted as interval 1 below), [2G, 5G] (denoted as interval 2 below), [5G, 10G] (denoted as interval 3 below), etc., which respectively indicate that a quantity of data stored in a database instance is from 1G to 2G, from 2G to 5G, and from 5G to 10G. A memory corresponding to interval 1 is 128M, a memory corresponding to interval 2 is 256M, and a memory corresponding to interval 3 is 512M. If the quantity of data stored in database instance 0 falls within interval 1, a memory of 128M is allocated to database instance 0. If the quantity of data stored in database instance 0 falls within interval 2, a memory of 256M is allocated to database instance 0, and so on.

In some embodiments, a part of the memory allocated for each database instance in the next period can be used as a memory for burst data write. The data burst write means that the memory needs to process a large quantity of write requests in a short time. Typically, a first part of the memory allocated to the database instance is used to store the data in the MemTable and a second part is used to store the data in the immutable MemTable. If a data burst is common, a part of the memory allocated to the database instance can be allocated as the memory for the data burst write, thereby alleviating write congestion and improving data write concurrency. In a setting method, the memory allocated to the database instance can be equally divided into three parts, where one part is used for writing regular data in the MemTable data, another part is used for writing regular data in the immutable MemTable, and a third part is used for writing burst data.

In addition, during running of a user process, an increasing quantity of database instances can be created. To prevent an excessively large quantity of database instances from occupying an excessively large memory and resulting in an insufficient memory, an upper instance limit value supported by the database can be predetermined. Each time a user creates a new database instance, it can be determined whether a quantity of currently created database instances is greater than the upper instance limit value. If yes, the creation is terminated and a message prompting a creation failure is returned. Otherwise, a new database instance is created. The upper instance limit value can be determined based on the available memory D_ava and the lower memory limit value d_min of the database instance, and the lower memory limit value of the database instance is a predetermined value. The upper instance limit value can be calculated based on the following equation: D_ava/d_min.

The solutions in the embodiments of this disclosure have the following advantages:

The memory in the next period is allocated to each database instance as needed based on the quantity of data stored in the database instance in the historical period, so that overall write amplification of each database instance can be optimized, thereby enhancing memory utilization and an overall write throughput capability.

In different periods, a data scale of each database instance dynamically changes, so that the memory allocated to each database instance also dynamically changes, thereby improving flexibility of memory allocation.

One or more embodiments of this disclosure further provide a kind of storage engine, configured to store data based on an LSM tree. The storage engine includes a storage, a processor, and a computer program that is stored in the storage and that is capable of running on the processor. The processor executes the program to implement the method in any one of the above-mentioned embodiments.

Figure 6:
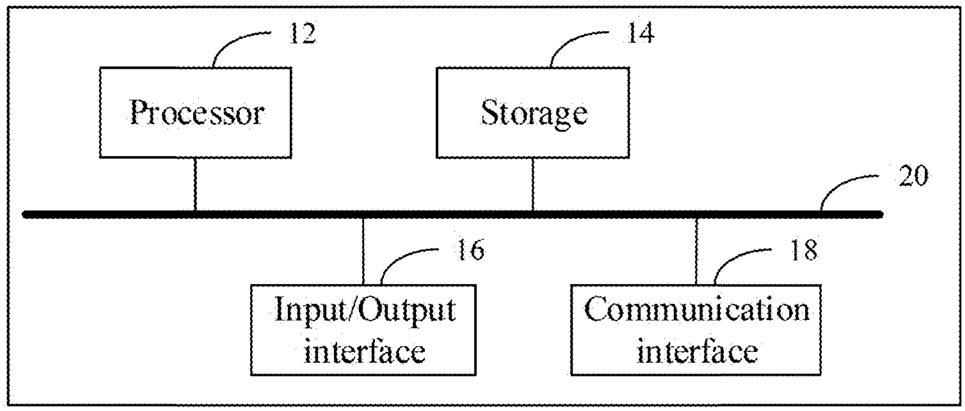
FIG. 6 is a schematic diagram illustrating a storage engine, according to one or more embodiments of this disclosure.

FIG. 6 is a schematic diagram illustrating a more specific hardware structure of a storage engine, according to one or more embodiments of the present disclose. The storage engine can include: a processor 12, a storage 14, an input/output interface 16, a communication interface 18, and a bus 20. The processor 12, the storage 14, the input/output interface 16, and the communication interface 18 are communicatively connected to each other within the device by using the bus 20.

The processor 12 can be implemented in a form of a general-purpose central processing unit (CPU), a microprocessor, an application-specific integrated circuit (ASIC), one or more integrated circuits, etc., and is configured to execute a related program to implement the technical solutions provided in the embodiments of this disclosure. The processor 12 can further include a graphics card, and the graphics card can be an Nvidia titan X graphics card, a 10120Ti graphics card, etc.

The storage 14 can be implemented in a form of a read-only memory (ROM), a random access memory (RAM), a static storage device, a dynamic storage device, etc. The storage 14 can store an operating system and other application programs. When the technical solutions provided in the embodiments of this disclosure are implemented by software or firmware, related program code is stored in the storage 14 and invoked and executed by the processor 12.

The input/output interface 16 is configured to connect to an input/output module to implement information input and output. The input/output module can be configured as a component in the device (not shown in the figure), or can be externally connected to the device to provide a corresponding function. An input device can include a keyboard, a mouse, a touch screen, a microphone, various sensors, etc., and an output device can include a display, a speaker, a vibrator, an indicator light, etc.

The communication interface 18 is configured to connect to a communication module (not shown in the figure) to implement communication and interaction between the device and other devices. The communication module can implement communication in a wired method (for example, a USB or a network cable), or in a wireless method (for example, a mobile network, Wi-Fi, or Bluetooth).

The bus 20 includes a channel for transmitting information between components (for example, the processor 12, the storage 14, the input/output interface 16, and the communication interface 18) of the device.

It is worthwhile to note that although only the processor 12, the storage 14, the input/output interface 16, the communication interface 18, and the bus 20 are shown in the above-mentioned device, in a specific implementation process, the storage engine can further include other components needed for normal running. In addition, a person skilled in the art can understand that, the above-mentioned storage engine can include only the components that are necessary for implementing the solutions in the embodiments of the present disclose, and does not necessarily include all the components shown in the figure.

One or more embodiments of this disclosure further provide a computer-readable storage medium. The computer-readable storage medium stores a computer program, and the program is executed by a processor to implement the method in any one of the above-mentioned embodiments.

The computer-readable medium includes a persistent and a non-persistent, a removable and a non-removable medium, which can implement information storage by using any method or technology. The information can be computer-readable instructions, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a cassette magnetic disk storage, or another magnetic storage device, or any other non-transmission media. The computer storage medium can be configured to store information accessible by a computing device. As described in this specification, the computer-readable medium does not include computer-readable transitory media such as a modulated data signal and a carrier.

It can be seen from the above-mentioned descriptions of the implementations that, a person skilled in the art can clearly understand that the embodiments of this disclosure can be implemented by using software and a necessary general hardware platform. Based on such an understanding, the technical solutions in the embodiments of this disclosure essentially or the part contributing to the existing technology can be implemented in a form of a software product. The computer software product can be stored in a storage medium, for example, a ROM/RAM, a magnetic disk, or an optical disc, and includes several instructions for instructing a computer device (which can be a personal computer, a server, a network device, etc.) to perform the method described in the embodiments of this disclosure or in some parts of the embodiments.

The system, apparatus, module, or unit illustrated in the above-mentioned embodiments can be specifically implemented by using a computer apparatus or an entity, or can be implemented by using a product having a specific function. A typical implementation device is a computer, and a specific form of the computer can be a personal computer, a laptop computer, a cellular phone, a camera phone, a smartphone, a personal digital assistant, a media player, a navigation device, an e-mail sending and receiving device, a game console, a tablet computer, a wearable device, or any combination of several of these devices.

The embodiments of this disclosure are described in a progressive way. For same or similar parts of the embodiments, mutual references can be made to the embodiments. Each embodiment focuses on a difference from other embodiments. In particular, the apparatus embodiments are basically similar to the method embodiments, and therefore are described briefly. For related parts, references can be made to partial descriptions in the method embodiments. The apparatus embodiments described above are merely examples. The modules described as separate parts may or may not be physically separate. During implementation of the solutions in the embodiments of this disclosure, functions of the modules can be implemented in one or more pieces of software and/or hardware. Some or all of the modules can be selected based on an actual need to implement the objective of the solutions of the embodiments. A person of ordinary skill in the art can understand and implement the embodiments without creative efforts.

The above-mentioned descriptions are merely specific implementations of the embodiments of the present disclose. It is worthwhile to note that a person of ordinary skill in the art can further make some improvements or polishing without departing from the principle of the embodiments of the present disclose, and the improvements or polishing shall fall within the protection scope of the embodiments of the present disclose.

What is claimed is:

1. A method for allocating database memory, comprising:

determining a quantity of data persisted by each of at least one database instance in a database to a persistent storage medium in a historical period, wherein the database is configured to store data based on a log-structured merge (LSM) tree, wherein a memory of the database is configured to store data in a MemTable and an immutable MemTable respectively corresponding to the at least one database instance, and wherein the memory of the database is distinct from the persistent storage medium to which the quantity of data is persisted;

predicting an amount of the memory needed by the each of the at least one database instance in a next period based on the quantity of data persisted by the each of the at least one database instance to the persistent storage medium in the historical period, wherein the amount of the memory needed by the each of the at least one database instance in the next period is positively correlated with the quantity of data persisted by the each of the at least one database instance to the persistent storage medium in the historical period such that a larger quantity of data persisted by the each of the at least one database instance to the persistent storage medium in the historical period results in a larger predicted amount of the memory for the each of the at least one database instance in the next period to reduce a frequency of writing data from the Mem Table located in the memory to the persistent storage medium; and allocating the memory for the each of the at least one database instance in the next period based on the amount of the memory needed by the each of the at least one database instance in the next period, thereby providing an available capacity of the memory based on the quantity of data accumulated on the persistent storage medium.

2. The method according to claim 1, wherein the quantity of data stored in the each of the at least one database instance in the historical period comprises a quantity of data stored in the each of the at least one database instance in a previous historical period, or an average value of quantities of data stored in the each of the at least one database instance in several previous historical periods.

3. The method according to claim 1, wherein the predicting a memory needed by the each of the at least one database instance in a next period based on the quantity of data stored in the each of the at least one database instance in the historical period comprises:

calculating a total quantity of data stored in all of the at least one database instance in the historical period;

determining a ratio of the quantity of data stored in the each of the at least one database instance in the historical period to the total quantity of data; and determining the memory needed by the each of the at least one database instance in the next period based on the ratio and an allocable memory, wherein a larger ratio indicates a larger proportion of a memory needed by a corresponding database instance in the next period in the allocable memory.

4. The method according to claim 3, wherein an upper memory limit value and a lower memory limit value are pre-configured for the each of the at least one database instance; and wherein a memory needed in the next period determined for a database instance is not greater than the upper memory limit value configured for the database instance and is not less than the lower memory limit value, memory allocation is performed based on the memory needed by the database instance in the next period.

5. The method according to claim 3, wherein an upper memory limit value and a lower memory limit value are pre-configured for the each of the at least one database instance; and wherein a memory needed in the next period determined for a database instance is greater than the upper memory limit value, the memory needed by the corresponding database instance in the next period is determined as a first memory value that is not greater than the upper memory limit value; or wherein a memory needed in the next period determined for a database instance is less than the lower memory limit value, the memory needed by the corresponding database instance in the next period is determined as a second memory value that is not less than the lower memory limit value.

6. The method according to claim 1, wherein a part of the memory allocated for the each of the at least one database instance in the next period is used as a memory for burst data write.

7. The method according to claim 1, wherein a quantity of database instances supported by the database does not exceed an upper instance limit value supported by the database, the upper instance limit value is determined based on an allocable memory and a lower memory limit value of the database instance, and the lower memory limit value of the database instance is a predetermined value.

8. A non-transitory, computer-readable medium storing one or more instructions executable by a computer system to perform operations for allocating database memory, comprising:

determining a quantity of data persisted by each of at least one database instance in a database to a persistent storage medium in a historical period, wherein the database is configured to store data based on a log-structured merge (LSM) tree, wherein a memory of the database is configured to store data in a MemTable and an immutable MemTable respectively corresponding to the at least one database instance, and wherein the memory of the database is distinct from the persistent storage medium to which the quantity of data is persisted;

predicting an amount of the memory needed by the each of the at least one database instance in a next period based on the quantity of data persisted by the each of the at least one database instance to the persistent storage medium in the historical period, wherein the amount of the memory needed by the each of the at least one database instance in the next period is positively correlated with the quantity of data persisted by the each of the at least one database instance to the persistent storage medium in the historical period such that a larger quantity of data persisted by the each of the at least one database instance to the persistent storage medium in the historical period results in a larger predicted amount of the memory for the each of the at least one database instance in the next period to reduce a frequency of writing data from the Mem Table located in the memory to the persistent storage medium; and allocating the memory for the each of the at least one database instance in the next period based on the amount of the memory needed by the each of the at least one database instance in the next period, thereby providing an available capacity of the memory based on the quantity of data accumulated on the persistent storage medium.

9. The non-transitory, computer-readable medium according to claim 8, wherein the quantity of data stored in the each of the at least one database instance in the historical period comprises a quantity of data stored in the each of the at least one database instance in a previous historical period, or an average value of quantities of data stored in the each of the at least one database instance in several previous historical periods.

10. The non-transitory, computer-readable medium according to claim 8, wherein the predicting a memory needed by the each of the at least one database instance in a next period based on the quantity of data stored in the each of the at least one database instance in the historical period comprises:

calculating a total quantity of data stored in all of the at least one database instance in the historical period;

determining a ratio of the quantity of data stored in the each of the at least one database instance in the historical period to the total quantity of data; and determining the memory needed by the each of the at least one database instance in the next period based on the ratio and an allocable memory, wherein a larger ratio indicates a larger proportion of a memory needed by a corresponding database instance in the next period in the allocable memory.

11. The non-transitory, computer-readable medium according to claim 8, wherein a part of the memory allocated for the each of the at least one database instance in the next period is used as a memory for burst data write.

12. The non-transitory, computer-readable medium according to claim 8, wherein a quantity of database instances supported by the database does not exceed an upper instance limit value supported by the database, the upper instance limit value is determined based on an allocable memory and a lower memory limit value of the database instance, and the lower memory limit value of the database instance is a predetermined value.

13. The non-transitory, computer-readable medium according to claim 8, wherein the quantity of data stored in the each of the at least one database instance in the historical period is:

a total quantity of data corresponding to the each of the at least one database instance that has been persisted to a persistent storage medium; or a total quantity of data corresponding to the each of the at least one database instance stored in the memory and data that has been persisted to a persisted storage medium.

14. A computer-implemented device for allocating database memory, comprising:

one or more processors; and one or more tangible, non-transitory, machine-readable media storing one or more instructions that, when executed by the one or more processors, perform one or more operations comprising:

determining a quantity of data persisted by each of at least one database instance in a database to a persistent storage medium in a historical period, wherein the database is configured to store data based on a log-structured merge (LSM) tree, wherein a memory of the database is configured to store data in a Mem Table and an immutable Mem Table respectively corresponding to the at least one database instance, and wherein the memory of the database is distinct from the persistent storage medium to which the quantity of data is persisted;

predicting an amount of the memory needed by the each of the at least one database instance in a next period based on the quantity of data persisted by the each of the at least one database instance to the persistent storage medium in the historical period, wherein the amount of the memory needed by the each of the at least one database instance in the next period is positively correlated with the quantity of data persisted by the each of the at least one database instance to the persistent storage medium in the historical period such that a larger quantity of data persisted by the each of the at least one database instance to the persistent storage medium in the historical period results in a larger predicted amount of the memory for the each of the at least one database instance in the next period to reduce a frequency of writing data from the Mem Table located in the memory to the persistent storage medium; and allocating the memory for the each of the at least one database instance in the next period based on the amount of the memory needed by the each of the at least one database instance in the next period, thereby providing an available capacity of the memory based on the quantity of data accumulated on the persistent storage medium.

15. The computer-implemented device according to claim 14, wherein the quantity of data stored in the each of the at least one database instance in the historical period comprises a quantity of data stored in the each of the at least one database instance in a previous historical period, or an average value of quantities of data stored in the each of the at least one database instance in several previous historical periods.

16. The computer-implemented device according to claim 14, wherein the predicting a memory needed by the each of the at least one database instance in a next period based on the quantity of data stored in the each of the at least one database instance in the historical period comprises:

calculating a total quantity of data stored in all of the at least one database instance in the historical period;

determining a ratio of the quantity of data stored in the each of the at least one database instance in the historical period to the total quantity of data; and determining the memory needed by the each of the at least one database instance in the next period based on the ratio and an allocable memory, wherein a larger ratio indicates a larger proportion of a memory needed by a corresponding database instance in the next period in the allocable memory.

17. The computer-implemented device according to claim 14, wherein a part of the memory allocated for the each of the at least one database instance in the next period is used as a memory for burst data write.

18. The computer-implemented device according to claim 14, wherein a quantity of database instances supported by the database does not exceed an upper instance limit value supported by the database, the upper instance limit value is determined based on an allocable memory and a lower memory limit value of the database instance, and the lower memory limit value of the database instance is a predetermined value.

* * * * *